US012327704B2

(12) United States Patent
Nishida et al.

(10) Patent No.: US 12,327,704 B2
(45) Date of Patent: Jun. 10, 2025

(54) ELECTROMAGNETIC RELAY

(71) Applicant: OMRON Corporation, Kyoto (JP)

(72) Inventors: Takeshi Nishida, Kyoto (JP); Ryota Minowa, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 149 days.

(21) Appl. No.: 17/801,262

(22) PCT Filed: Jan. 18, 2021

(86) PCT No.: PCT/JP2021/001446

§ 371 (c)(1),
(2) Date: Aug. 22, 2022

(87) PCT Pub. No.: WO2021/181878

PCT Pub. Date: Sep. 16, 2021

(65) Prior Publication Data

US 2023/0104469 A1 Apr. 6, 2023

(30) Foreign Application Priority Data

Mar. 13, 2020 (JP) ................................ 2020-044573

(51) Int. Cl.
*H01H 50/38* (2006.01)
*H01H 9/44* (2006.01)

(52) U.S. Cl.
CPC ............ *H01H 50/38* (2013.01); *H01H 9/443* (2013.01)

(58) Field of Classification Search
CPC ............................... H01H 9/443; H01H 50/38
USPC .......................................................... 335/201
See application file for complete search history.

(56) References Cited

U.S. PATENT DOCUMENTS 4,292,614 A * 9/1981 Ono ..................... H01H 50/023 335/132
5,008,487 A * 4/1991 Shimmyo ............ H05K 9/0073 174/373
6,960,972 B2 * 11/2005 Nakamura ............. H01H 50/10 335/128
(Continued)

FOREIGN PATENT DOCUMENTS

CN 202721086 U 2/2013
CN 106716589 A 5/2017
(Continued)

OTHER PUBLICATIONS

The Office Action of the corresponding Japanese application No. 2020-44573 issued on Jan. 16, 2024.
(Continued)

*Primary Examiner* — Alexander Talpalatski
(74) *Attorney, Agent, or Firm* — SHINJYU GLOBAL IP

(57) ABSTRACT

An electromagnetic relay includes a base, a contact block, an electromagnet block, a permanent magnet, and a rigid member. The base is insulating. The contact block is placed on the base. The electromagnet block is placed on the base at a space from the contact block. The permanent magnet generates a magnetic field in the contact block. The rigid member is made of a magnetic material having a higher rigidity than the base, is incorporated in the base, and suppresses a magnetic flux leakage of the permanent magnet.

5 Claims, 6 Drawing Sheets

(56) References Cited

U.S. PATENT DOCUMENTS

| | | | | |
|---|---|---|---|---|
| 7,782,162 | B2 * | 8/2010 | Nishida | H01H 50/56<br>335/83 |
| 7,915,985 | B2 * | 3/2011 | Schmitz | H01H 9/443<br>335/201 |
| 8,198,964 | B2 * | 6/2012 | Yoshihara | H01H 51/29<br>335/131 |
| 8,558,647 | B2 * | 10/2013 | Shinkai | H01H 50/023<br>335/83 |
| 8,659,372 | B2 * | 2/2014 | Morimura | H01H 9/443<br>335/201 |
| 8,674,796 | B2 * | 3/2014 | Ito | H01H 9/44<br>335/133 |
| 8,823,474 | B2 * | 9/2014 | Kakimoto | H01H 9/46<br>335/201 |
| 9,082,575 | B2 * | 7/2015 | Yamashita | H01H 9/443 |
| 9,087,655 | B2 * | 7/2015 | Enomoto | H01H 50/546 |
| 9,412,545 | B2 * | 8/2016 | Kubono | H01H 50/60 |
| 9,881,758 | B2 * | 1/2018 | Uruma | H01H 50/546 |
| 10,515,774 | B2 * | 12/2019 | Sunohara | H01H 50/24 |
| 10,541,093 | B2 * | 1/2020 | Zhang | H01H 9/168 |
| 2014/0015628 | A1 | 1/2014 | Shinkai et al. | |
| 2014/0022035 | A1 * | 1/2014 | Yamashita | H01H 9/443<br>335/201 |
| 2014/0028418 | A1 * | 1/2014 | Yamashita | H01H 50/54<br>335/201 |
| 2014/0159837 | A1 * | 6/2014 | Hiraiwa | H01H 9/443<br>335/201 |
| 2016/0300673 | A1 | 10/2016 | Yamagata | |
| 2017/0301495 | A1 | 10/2017 | Hayashida et al. | |
| 2018/0068818 | A1 | 3/2018 | Itoda et al. | |

FOREIGN PATENT DOCUMENTS

| | | | |
|---|---|---|---|
| CN | 107533936 | A | 1/2018 |
| CN | 110010390 | A | 7/2019 |
| JP | S59-224029 | A | 12/1984 |
| JP | 4883232 | B1 | 2/2012 |
| JP | 2013-80692 | A | 5/2013 |
| JP | 2016-110843 | A | 6/2016 |
| JP | 2016-201188 | A | 12/2016 |
| JP | 2017-27892 | A | 2/2017 |

OTHER PUBLICATIONS

The International Search Report of International Application No. PCT/JP2021/001446 issued on Apr. 6, 2021.

The Written Opinion of the International Searching Authority of International Application No. PCT/JP2021/001446 issued on Apr. 6, 2021.

The Office Action for the corresponding Chinese application No. 202180016521.4 issued on Oct. 18, 2024.

* cited by examiner

ELECTROMAGNETIC RELAY

This application is the U.S. National Phase of International Application No. PCT/JP2021/001446, filed on Jan. 18, 2021. This application claims priority to Japanese Patent Application No. 2020-044573, filed Mar. 13, 2020. The contents of those applications are incorporated by reference herein in their entireties.

FIELD

The present invention relates to an electromagnetic relay.

BACKGROUND

Conventionally, an electromagnetic relay in which a contact block which is a conductive portion and an electromagnet block are mounted as a base is known (see Japanese Patent No. 4883232). The base is made of an insulating material such as resin.

SUMMARY

Since the base is made of an insulating material such as resin, it may be deformed under the influence of heat during energization. If the displacement of the members comprising the contact block or the electromagnet block or the distance between the contact block and the electromagnet block changes due to this deformation of the base, the characteristics of the relay may change and the performance of the relay may be adversely affected.

An object of the present invention is to suppress deformation of a base in an electromagnetic relay.

An electromagnetic relay according to an aspect of the present invention includes a base, a contact block, an electromagnet block, a permanent magnet, and a rigid member. The base is insulating. The contact block is placed on the base. The electromagnet block is placed on the base at a space from the contact block. The permanent magnet generates a magnetic field in the contact block. The rigid member is made of a magnetic material having a higher rigidity than the base, is incorporated in the base, and suppresses a magnetic flux leakage of the permanent magnet.

In this electromagnetic relay, the rigid member having a higher rigidity than the base is incorporated in the base, so that the strength of the base is increased. As a result, it is possible to prevent the base from being deformed by heat or mechanical stress. Further, since the rigid member is made of a magnetic material, it is possible to suppress the magnetic flux leakage of the permanent magnet.

The rigid member may extend from the contact block to the electromagnet block in a spacing direction between the contact block and the electromagnet block. In this case, the strength of the rigid member can be further increased. Further, since the rigid member extends to the contact block, it becomes easy to suppress the magnetic flux leakage of the permanent magnet.

The contact block may include a first fixed terminal fixed to the base and a second fixed terminal fixed to the base at a space from the first fixed terminal. The rigid member may extend in a spacing direction between the first fixed terminal and the second fixed terminal adjacent to the first fixed terminal and the second fixed terminal. In this case, the magnetic flux leakage of the permanent magnet can be suppressed more effectively.

The rigid member may be disposed at a position without overlapping with the permanent magnet when viewed from a direction perpendicular to the permanent magnet. In this case, it is possible to prevent the magnetic force of the permanent magnet from being weakened due to the rigid member.

The rigid member may extend at least partially in a direction orthogonal to the base. Also in this case, since the rigid member having a higher rigidity than the base is incorporated in the base, the strength of the base is increased. Further, since the rigid member is made of a magnetic material, it is possible to suppress the magnetic flux leakage of the permanent magnet.

The rigid member may be a yoke connected to the permanent magnet and may surround the contact block. In this case, since the rigid member also serves as the yoke, the number of parts can be reduced while increasing the strength of the base.

DETAILED DESCRIPTION

Hereinafter, an embodiment of an electromagnetic relay according to one aspect of the present invention will be described with reference to the drawings. Hereinafter, a direction indicated by an X axis in FIG. 1 will be referred to as an X-axis direction, a direction indicated by a Y axis will be referred to as a Y-axis direction, and a direction indicated by a Z axis will be referred to as a Z-axis direction.

Figure 1:
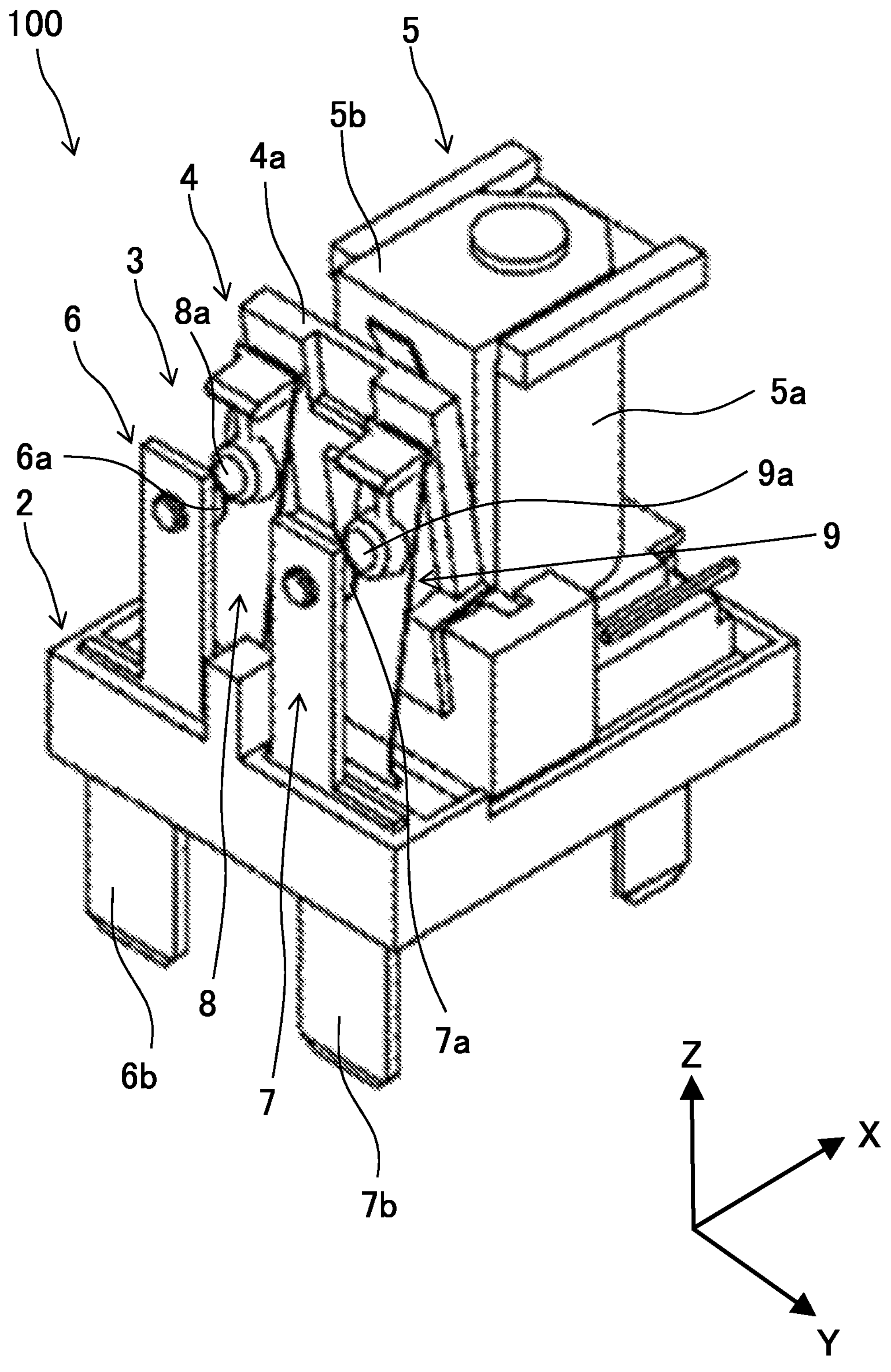
FIG. 1 is a perspective view of an electromagnetic relay as viewed from above.
Figure 2:
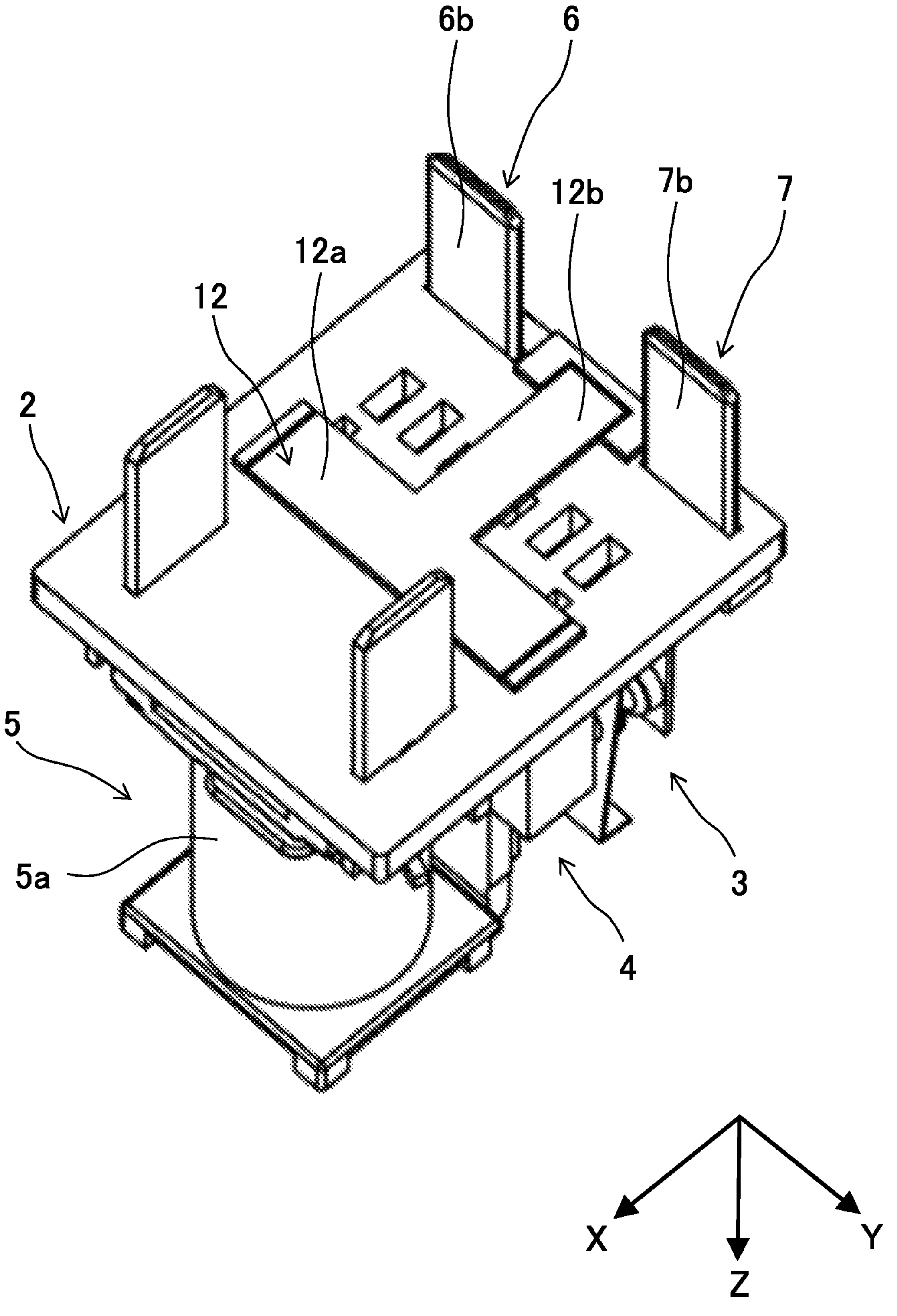
FIG. 2 is a perspective view of an electromagnetic relay as viewed from below.
Figure 3:
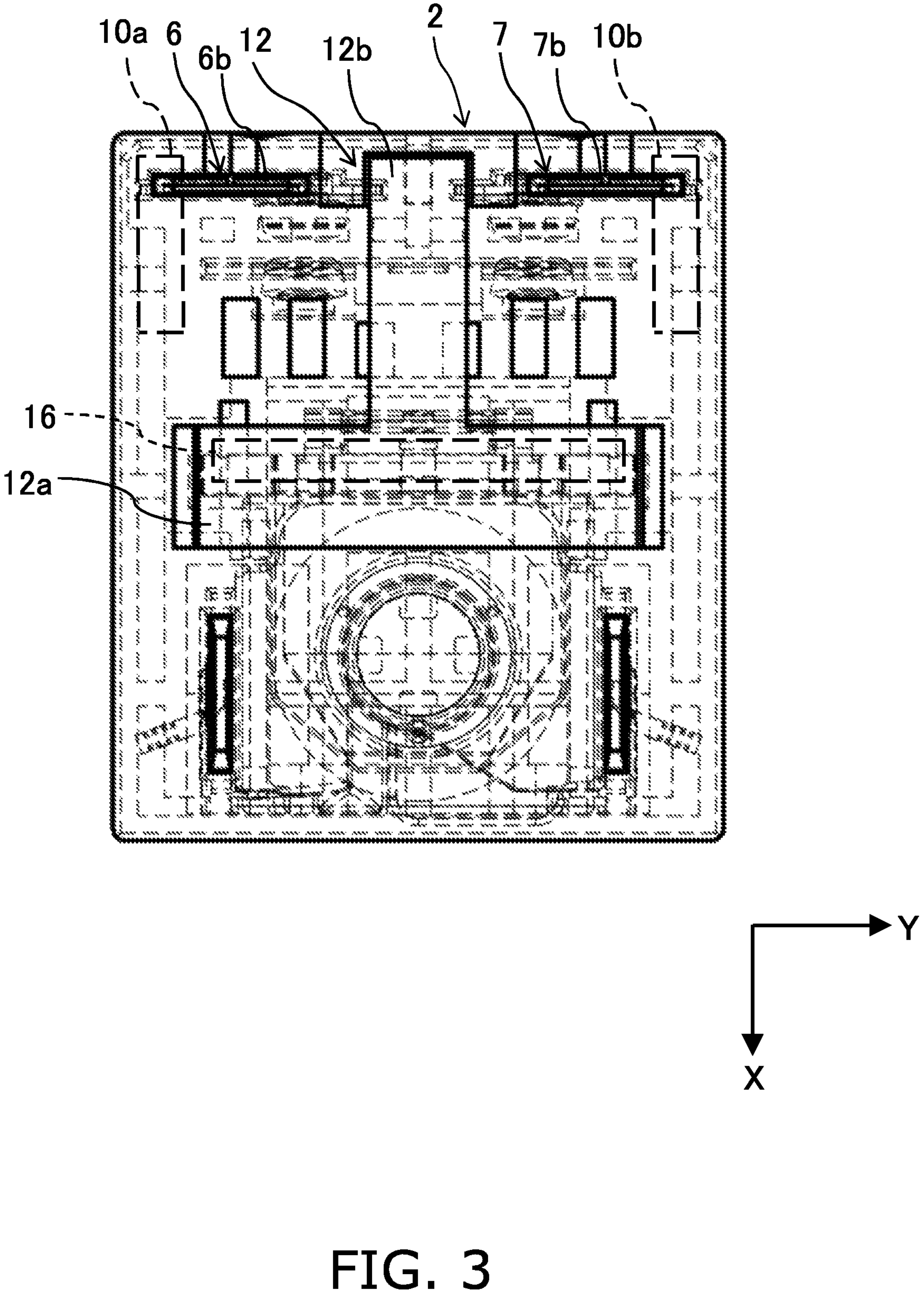
FIG. 3 is a bottom view of an electromagnetic relay.

FIG. 1 is a perspective view of the electromagnetic relay 100 as viewed from above. FIG. 2 is a perspective view of the electromagnetic relay 100 as viewed from below. FIG. 3 is a bottom view of the electromagnetic relay 100.

The electromagnetic relay 100 includes a base 2, a contact block 3, a movable mechanism 4, and an electromagnet block 5.

The base 2 is made of an insulating material such as a resin. The base 2 has a substantially rectangular shape when viewed from the Z-axis direction, and extends longer in the X-axis direction than in the Y-axis direction. The upper part of the base 2 is covered with a cover (not shown). In the present embodiment, a length direction of the base 2 corresponds to the X-axis direction, a width direction of the base 2 corresponds to the Y-axis direction, and a height direction of the base 2 corresponds to the Z-axis direction. The base 2 may be longer in the Y-axis direction than in the X-axis direction when viewed from the Z-axis direction, or may have the same length in the X-axis direction and the Y-axis direction.

The contact block 3 is placed on the base 2. The contact block 3 is supported by the base 2. The contact block 3 includes a fixed terminal 6, a fixed terminal 7, a movable contact piece 8, and a movable contact piece 9. The fixed terminals 6 and 7 and the movable contact pieces 8 and 9 are plate-shaped terminals and are made of a conductive material. The fixed terminals 6 and 7 and the movable contact pieces 8 and 9 extend in the Z-axis direction and are press-fitted and fixed to the base 2.

The fixed terminal 6 includes a fixed contact 6*a* and an external connection portion 6*b*. The external connection portion 6*b* protrudes downward from the base 2 and is electrically connected to an external device (not shown). The fixed terminal 7 has the same shape as the fixed terminal 6. The fixed terminal 7 is disposed at a space from the fixed terminal 6 in the Y-axis direction. The fixed terminal 7 includes a fixed contact 7*a* and an external connection portion 7*b*. The external connection portion 7*b* protrudes downward from the base 2 and is electrically connected to an external device (not shown).

The movable contact piece 8 is composed of an elastically deformable leaf spring, and is disposed facing the fixed terminal 6 in the X-axis direction. The movable contact piece 8 includes a movable contact 8*a*. The movable contact 8*a* can contact with the fixed contact 6*a*.

The movable contact piece 9 is composed of an elastically deformable leaf spring, and is disposed facing the fixed terminal 7 in the X-axis direction. The movable contact piece 9 is electrically connected to the movable contact piece 8 via a connection portion (not shown) extending in the X-axis direction. The connection portion is press-fitted into the base 2. The movable contact piece 9 includes a movable contact 9*a*. The movable contact 9*a* can contact with the fixed contact 7*a*.

The movable mechanism 4 moves the movable contact pieces 8 and 9 in a contact direction in which the movable contacts 8*a* and 9*a* come into contact with the fixed contacts 6*a* and 7*a* and in a separating direction in which the movable contacts 8*a* and 9*a* are separated. The movable mechanism 4 includes a card member 4*a* and a movable iron piece (not shown). The card member 4*a* is an insulating member and is disposed between the contact block 3 and the electromagnet block 5. The card member 4*a* is rotatably supported by the base 2. The card member 4*a* is connected to the movable contact pieces 8 and 9. The movable iron piece presses the card member 4*a* in the contact direction by an electromagnetic force of the electromagnet block 5.

The electromagnet block 5 is placed on the base 2 at a space from the contact block 3 in the X-axis direction. The electromagnet block 5 is supported by the base 2. The electromagnet block 5 operates the movable mechanism 4 by the electromagnetic force. Specifically, the electromagnet block 5 includes a coil 5*a* and a yoke 5*b*. When a voltage is applied to the coil 5*a* and it is excited, the movable iron piece presses the card member 4*a*. When the card member 4*a* is pressed by the movable iron piece and rotates, the movable contact pieces 8 and 9 are pressed in the contact direction. As a result, the movable contacts 8*a* and 9*a* come into contact with the fixed contacts 6*a* and 7*a*.

As shown in FIG. 3, the electromagnetic relay 100 further includes permanent magnets 10*a* and 10*b* and a rigid member 12. The permanent magnets 10*a* and 10*b* generate a magnetic field in the contact block 3. The permanent magnets 10*a* and 10*b* are provided to extend the are generated when the movable contacts 8*a* and 9*a* are separated from the fixed contacts 6*a* and 7*a*. The permanent magnet 10*a* are disposed at a space from the permanent magnet 10*b* in the Y-axis direction so as to face the permanent magnets 10*b*. The permanent magnets 10*a* and 10*b* have a rectangular shape and are supported by a cover (not shown). The fixed contacts 6*a* and 7*a* and the movable contacts 8*a* and 9*a* are disposed between the permanent magnet 10*a* and the permanent magnet 10*b* in the Y-axis direction.

The rigid member 12 is made of a magnetic material having a higher rigidity than the base 2. The rigid member 12 is made of a soft magnetic material, such as iron. The rigid member 12 is a substantially plate-shaped member, and in the present embodiment, has a T-shape when viewed from the Z-axis direction. The rigid member 12 extends in a spacing direction (X-axis direction) between the contact block 3 and the electromagnet block 5 so as to straddle the contact block 3 and the electromagnet block 5. The rigid member 12 increases the strength of the base 2 and suppresses a magnetic flux leakage of the permanent magnets 10*a* and 10*b*.

The rigid member 12 includes a first extension portion 12*a* and a second extension portion 12*b*. The first extension portion 12*a* extends in the Y-axis direction. The first extension portion 12*a* is disposed at a position where the electromagnet block 5 overlaps the fixed portion 16 fixed to the base 2 when viewed from the Z-axis direction. The second extension portion 12*b* extends in the X-axis direction from the vicinity of the center of the first extension portion 12*a* in the Y-axis direction. The second extension portion 12*b* extends between the fixed terminal 6 and the fixed terminal 7 when viewed from the Z-axis direction. By arranging the rigid member 12 adjacent to the fixed terminals 6 and 7, it becomes easy to suppress the magnetic flux leakage of the permanent magnets 10*a* and 10*b*.

The rigid member 12 is incorporated in the base 2 by a fixing means such as insert molding or press fitting. When the rigid member 12 is disposed adjacent to the fixed terminals 6 and 7, since an insulating distance between the terminals is shortened, it is preferable to cover the entire surface or a part of the rigid member 12 with an insulating material such as epoxy resin, urethane, or ultraviolet curable resin. As shown in FIGS. 2 and 3, a part of the rigid member 12 may be exposed to the outside from the base 2.

The rigid member 12 is disposed at a position without overlapping with the permanent magnets 10*a* and 10*b* when viewed from a direction perpendicular to the permanent magnets 10*a* and 10*b* (Y-axis direction). In this embodiment, the permanent magnets 10*a* and 10*b* are disposed above the rigid member 12.

In the electromagnetic relay 100 described above, since the rigid member 12 having a higher rigidity than the base 2 is incorporated in the base 2, the strength of the base 2 is increased. As a result, it is possible to prevent the base 2 from being deformed by heat or mechanical stress. Further, since the rigid member 12 is made of a magnetic material, it is possible to suppress the magnetic flux leakage of the permanent magnets 10*a* and 10*b*. Further, it is possible to suppress the contact block 3 from being affected by an external magnetic field. Further, when a part of the rigid member 12 is exposed to the outside from the base 2, the heat generated by the contact block 3 and the electromagnet block 5 can be dissipated to the outside by the rigid member 12.

One embodiment of the electromagnetic relay according to one aspect of the present invention has been described above, but the present invention is not limited to the above embodiment, and various modifications can be made without departing from the gist of the present invention. For example, the configuration of the movable mechanism 4 may be changed. The shapes or arrangements of the base 2, the contact block 3, the electromagnet block 5, and the permanent magnets 10*a* and 10*b* may be changed. One or more than three permanent magnets may be provided.

The fixed contact 6*a* may be integrated with or a separate body from the fixed terminal 6. The fixed contact 7*a* may be integrated with or a separate body from the fixed terminal 7. The movable contact 8*a* may be integrated with or a separate body from the movable contact piece 8. The movable contact 9*a* may be integrated with or a separate body from movable contact piece 9.

Figure 4:
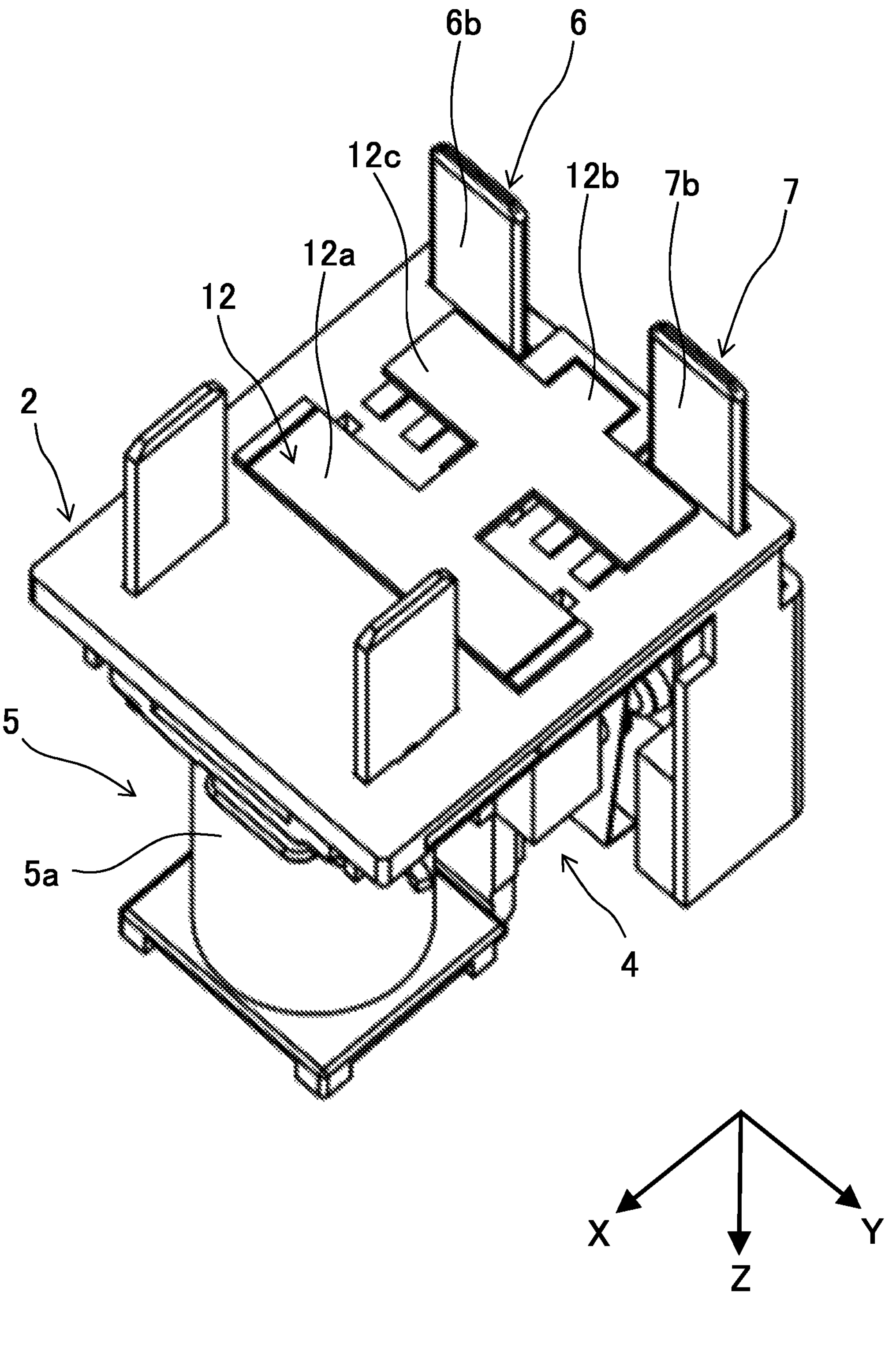
FIG. 4 is a perspective view of an electromagnetic relay according to a first modification example as viewed from below.
Figure 5:
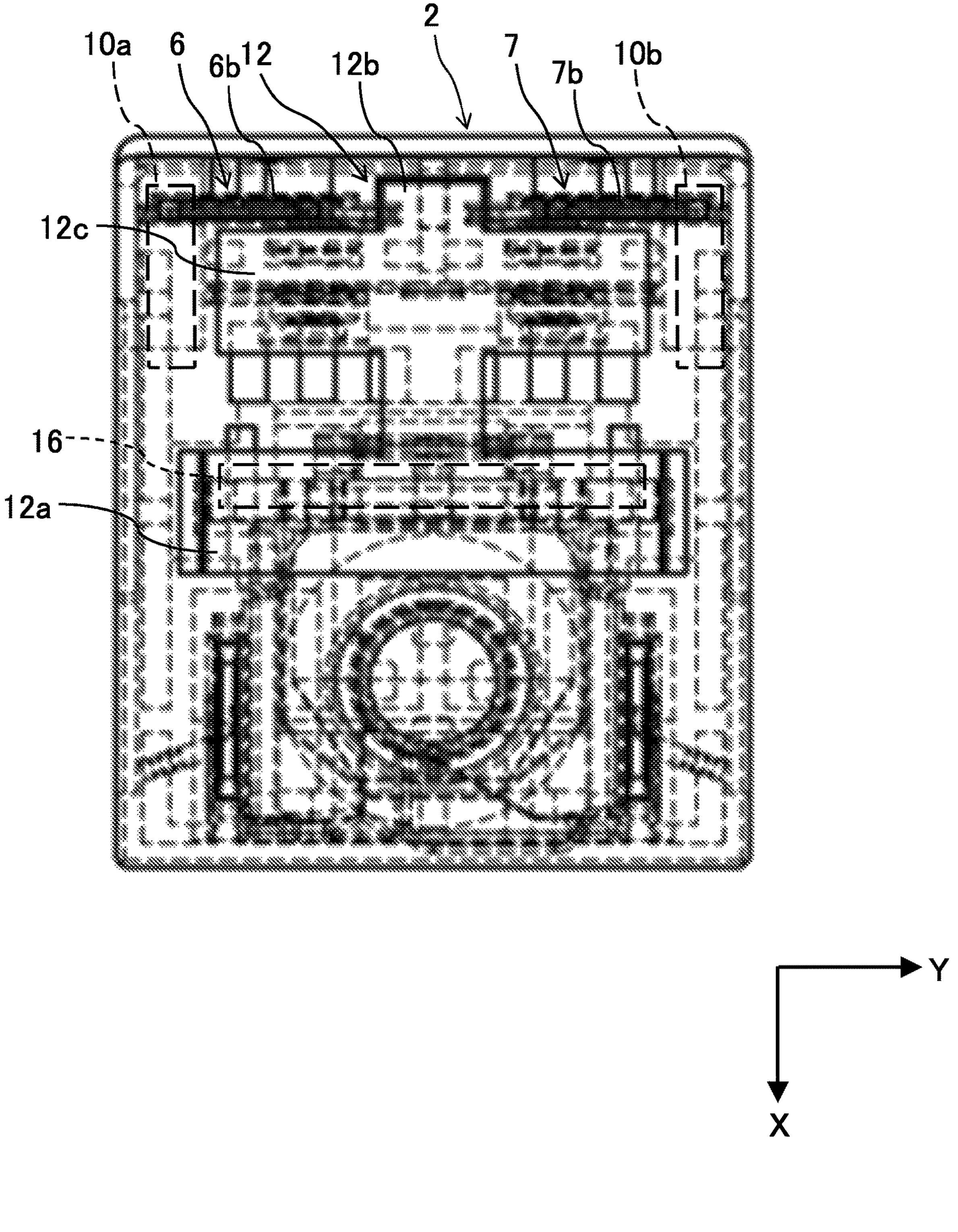
FIG. 5 is a bottom view of an electromagnetic relay according to a first modification example.

The shape or arrangement of the rigid member 12 are not limited to the above-described embodiment. For example, as shown in FIGS. 4 and 5, the rigid member 12 may include a third extension portion extending in the spacing direction (Y-axis direction) between the fixed terminal 6 and the fixed terminal 7 adjacent to the fixed terminal 6 and the fixed terminal 7. The third extension portion 12*c* extends from the second extension portion 12*b* in the Y-axis direction. Specifically, the third extension portion 12*c* extends in the Y-axis direction between the permanent magnet 10*a* and the permanent magnet 10*b* when viewed from the Z-axis direction. The third extension portion 12*c* can further suppress the magnetic flux leakage of the permanent magnets 10*a* and 10*b*, and can further increase the strength of the base 2. The third extension portion 12*c* may overlap with the permanent magnets 10*a* and 10*b* in the Z-axis direction.

Figure 6:
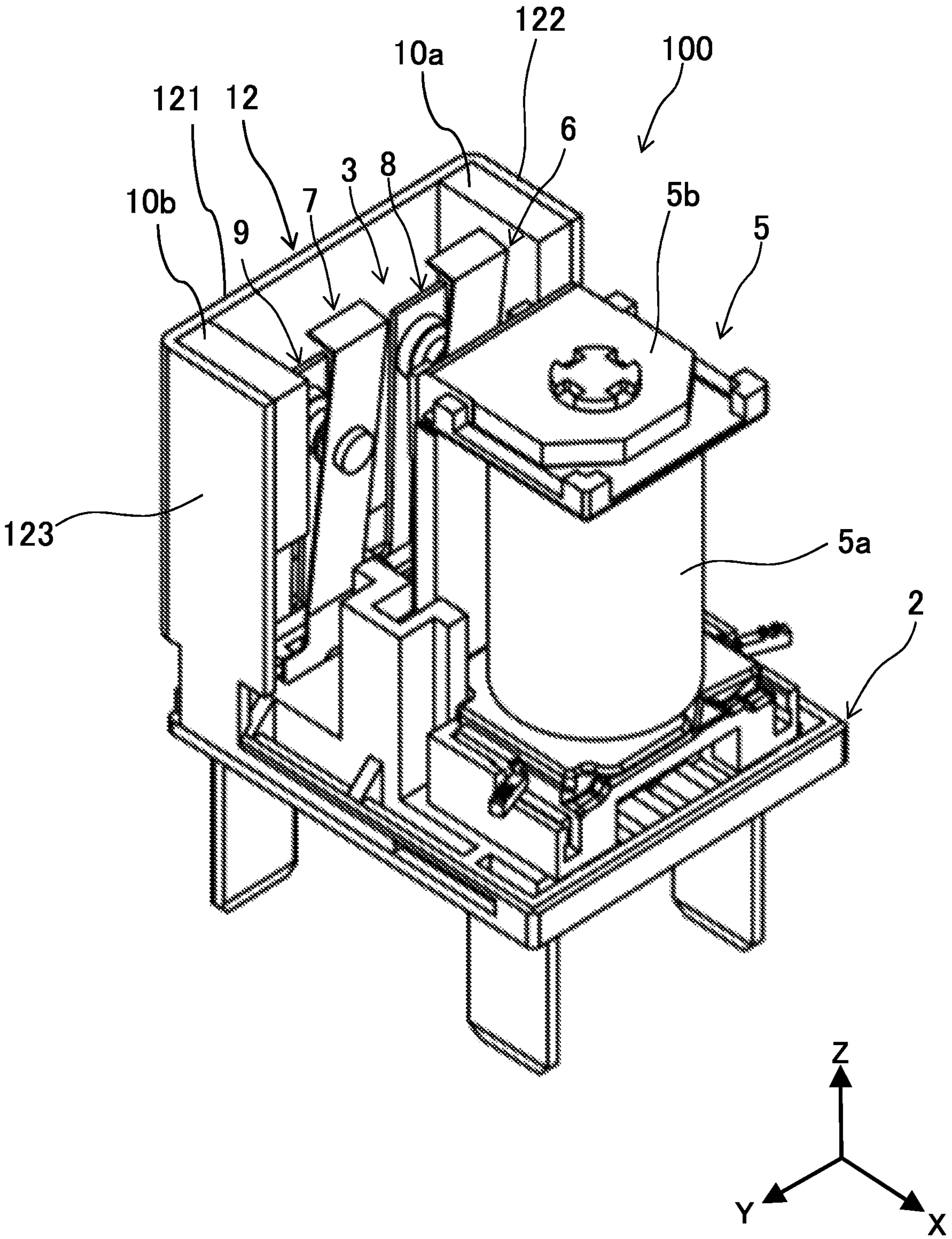
FIG. 6 is a perspective view of an electromagnetic relay according to a second modification example as viewed from above.

Further, as shown in FIG. 6, the rigid member 12 extends at least partially in a direction (Z direction) orthogonal to the base 2. Here, the rigid member 12 is a yoke connected to the permanent magnets 10*a* and 10*b*, and is incorporated in the base 2 so as to surround the contact block 3. The rigid member 12 has a substantially U-shape when viewed from the Z direction. The rigid member 12 includes a central portion 121 and a pair of side portions 122 and 123. The central portion 121 extends in the Y-axis direction and the Z-axis direction. The pair of side portions 122 and 123 extend in the X-axis direction from both ends of the central portion 121 in the Y-axis direction. The side portion 122 and the side portion 123 face each other in the Y-axis direction. The side portion 122 is in contact with the permanent magnet 10*a*. The side portion 123 is in contact with the permanent magnet 10*b*. Even in this case, the rigid member 12 can increase the strength of the base 2 and suppress the magnetic flux leakage of the permanent magnets 10*a* and 10*b*.

REFERENCE NUMERALS

2 Base
3 Contact block
5 Electromagnet block
6 Fixed terminal (Example of first fixed terminal)
7 Fixed terminal (Example of second fixed terminal)
10*a* Permanent magnet
10*b* Permanent magnet
12 Rigid member
100 Electromagnetic relay

The invention claimed is:

1. An electromagnetic relay, comprising:
a base having an insulating property;
a contact block placed on the base, the contact block including a first fixed terminal penetrating the base in a first direction;
an electromagnet block placed on the base at a space from the contact block in a second direction orthogonal to the first direction;
a pair of permanent magnets configured to generate a magnetic field in the contact block, the pair of permanent magnets including a first permanent magnet and a second permanent magnet disposed opposite the first permanent magnet; and
a rigid member made of a magnetic material having a higher rigidity than the base, the rigid member being incorporated in the base, the rigid member being configured to suppress a magnetic flux leakage of the pair of permanent magnets, wherein
at least a part of the rigid member is disposed between the first permanent magnet and the second permanent magnet as viewed from the first direction, and
the rigid member extends from the contact block to the electromagnet block in the second direction as viewed from the first direction.

2. The electromagnetic relay according to claim 1, wherein
the contact block further includes a second fixed terminal fixed to the base at a space from the first fixed terminal, and
the rigid member extends in a spacing direction between the first fixed terminal and the second fixed terminal adjacent to the first fixed terminal and the second fixed terminal.

3. The electromagnetic relay according to claim 1, wherein the rigid member is disposed at a position without overlapping with the pair of permanent magnets when viewed from a direction perpendicular to the permanent magnet.

4. The electromagnetic relay according to claim 1, wherein the rigid member extends at least partially in a direction orthogonal to the base.

5. The electromagnetic relay according to claim 4, wherein the rigid member is a yoke connected to the pair of permanent magnets, the rigid member surrounding the contact block.

* * * * *